United States Patent [19]

Chung et al.

[11] Patent Number: 4,531,221
[45] Date of Patent: Jul. 23, 1985

[54] PREMODULATION FILTER FOR GENERATING A GENERALIZED TAMED FREQUENCY MODULATED SIGNAL

[75] Inventors: Kah-Seng Chung; Leo E. Zegers, both of Eindhoven, Netherlands

[73] Assignee: U.S. Philips Corporation, New York, N.Y.

[21] Appl. No.: 478,397

[22] Filed: Mar. 24, 1983

[30] Foreign Application Priority Data

Apr. 13, 1982 [NL] Netherlands .......................... 8201533

[51] Int. Cl.³ .............................................. H04B 3/14
[52] U.S. Cl. .......................................... 375/60; 333/18; 364/724
[58] Field of Search .................. 375/11, 18, 17, 53, 375/60, 86; 329/104; 364/724; 333/18

[56] References Cited

U.S. PATENT DOCUMENTS

| Re. 30,182 | 12/1979 | Howson | 375/18 |
|---|---|---|---|
| 3,492,578 | 1/1970 | Gerrish et al. | 375/18 |
| 3,506,918 | 12/1970 | Perrault | 375/11 |
| 3,508,153 | 4/1970 | Gerrish et al. | 375/18 |
| 3,679,977 | 7/1972 | Howson | 375/18 |
| 3,706,054 | 12/1972 | Starr | 375/60 |
| 3,829,779 | 8/1974 | Fujimoto | 375/18 |
| 4,123,710 | 10/1978 | Stuart et al. | 375/18 |
| 4,229,821 | 10/1980 | de Jager et al. | 375/86 |

Primary Examiner—Robert L. Griffin
Assistant Examiner—Stephen Chin
Attorney, Agent, or Firm—Thomas A. Briody; William J. Streeter

[57] ABSTRACT

A transmitter for transmitting a carrier whose frequency is modulated by pseudo five-level signals. In order to obtain a simple receiver and an improved signal-to-noise ratio, a substantially three-level signal is generated in the transmitter at the detection instants $t=(2m-1)T/2$ by means of a pre-modulation filter.

2 Claims, 9 Drawing Figures

PREMODULATION FILTER FOR GENERATING A GENERALIZED TAMED FREQUENCY MODULATED SIGNAL

BACKGROUND OF THE INVENTION

The invention relates to a transmitter for transmitting frequency-modulated signals, comprising a pre-modulation filter for generating from an incoming data signal a data signal which at instants t=nT has at least five signal levels, and a frequency modulator connected to the premodulation filter.

Such a transmitter is described in the article "Tamed Frequency Modulation, A Novel Method to Achieve Spectrum Economy in Digital Transmission" by F. de Jager and C. B. Dekker and published in "IEEE Transactions on Communications" Vol. Com. 26 no. 5, May 1978. The modulation described in this article relates to what is commonly referred to as tamed frequency modulation.

Frequency-modulation is preferably employed in radio communication systems because of the constant amplitude of a frequency-modulated carrier, which enables high-efficiency amplification by means of non-linear amplification. A disadvantage of frequency modulation is however that the spectrum is rather wide. In order to reduce this spectrum in digital signal transmission, the data to be transmitted is preprocessed by employing a certain intersymbol interference, whereby signals with pseudo multi-level signals are obtained, before they are applied to the frequency modulator.

So, in accordance with the above-mentioned article for the generation of a TFM signal a pseudo fivelevel signal is first assembled from an incoming data signal in accordance with the code rule: $\pi/2(a_{n-1}/4 + a_n/2 + a_{n+1}/4)$, wherein $a_n$ represents the $n^{th}$ bit of the incoming data signal with n=1, 2, .... It is filtered by means of a Nyquist III filter, realized by means of a Nyquist I raised cosine filter, and thereafter modulated on a carrier signal in a frequency modulator.

By means of such a preprocessing operation, or a similar one, the required bandwidth is indeed significantly reduced, but a pseudo five-level signal requires a comparatively complex detection circuit at the received side and normally requires coherent detection.

SUMMARY OF THE INVENTION

The invention has for its object to provide a transmitter which requires simple receivers and with which generally an improved signal-to-noise ratio is achieved in the transmission of data signals in a communication system comprising such a transmitter and which is optimal for non-coherent detection.

According to the invention, the transmitter of the type described in the opening paragraph is characterized in that the premodulation filter is further arranged to supply a substantially three-level signal at the sampling instants t=(2m−1)T/2, wherein T is the signal period of the bit period of the data signals and m is an integer.

In accordance with a preferred embodiment of a transmitter in accordance with the invention, the premodulation filter comprises the series arrangement of a non-recursive second order digital filter with three weighting factors, two of which are equal to each other, and a low-pass filter which satisfies the third Nyquist criterion and is realized by means of a "raised cosine" filter which satisfies the first Nyquist criterion. The mutually unequal weighting factors have the values A and B, the value of the weighting factor A and B, respectively of the non-recursive second order filter being less than ¼ and larger than ½, respectively, 2A+B being equal to 1 and the roll off coefficient $r_B$ of the "raised cosine" filter being unequal to zero.

It should be noted that from the article "On a class of generalized MSK" by P. Galko and S. Pasupathy, presented at the conference ICC '81, Denver, June 1981, pages 1–6 it is known per se to make the weighting factors for a non-recursive second order digital filter adjustable. In this article, however, a generalization of MSK signals is involved which, in contrast with the transmitter in accordance with the present invention, has for its object to improve the eye pattern at the sampling instants t=nT, wherein T is the signal period of the bit period of the data signals and n=0, 1, 2, 3, ... and which is suitable for coherent detection.

The invention and its advantages will now be further described with reference to embodiments shown in the Figures, corresponding elements in the different Figures having been given the same reference numerals.

DESCRIPTION OF THE EMBODIMENT

Figure 1:
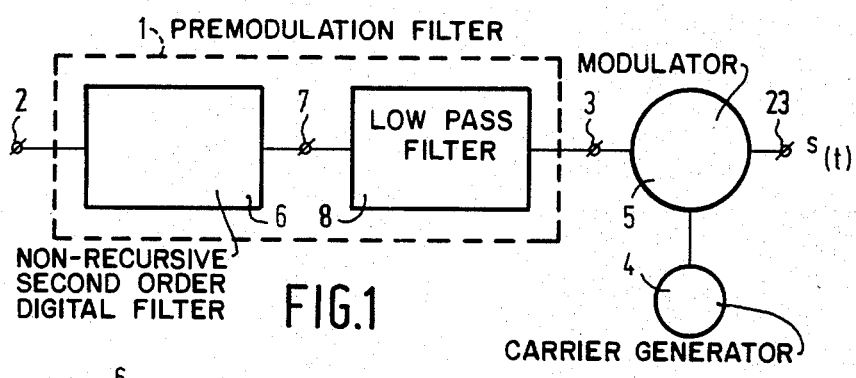
FIG. 1 shows a block circuit diagram of a portion of a transmitter suitable for transmitting a frequency-modulated carrier signal, modulated by a pseudo five-level signal derived from an incoming data signal.

The portion shown in FIG. 1 of a FM transmitter is disclosed in U.S. Pat. No. 4,229,821. It comprises a premodulation filter 1 housing an input terminal 2 which preferably receives a differentially encoded data signal a(t) which can be written as $$a(t) = \sum_{n=-\infty}^{\infty} a_n \cdot (t - nT)$$

wherein $a_n$ = +1 or −1 and T is the signal period of the bit period and t=nT are the sampling instants.

By means of this premodulation filter, which will be described in greater detail, a pseudo multi-level signal is generated. This pseudo multi-level signal is applied to a frequency modulator 5 to which a carrier signal supplied by a carrier generator 4 is applied. The signal S(t) thus formed by modulator 5 is applied to an aerial terminal 23.

The frequency-modulated signal $S(t)$ can be written as $$S(t) = \sin\{\omega_c t + \phi(t)\}$$

wherein $\omega_c$ is the carrier angular frequency and $\phi(t)$ the information-carrying, time-varying phase angle.

As described in inter alia the article "Tamed Frequency Modulation, A Novel Method to Achieve Spectrum Economy in Digital Transmission" by F. de Jager and C. B. Dekker, published in IEEE Transactions on Communications, Vol. Com. 26, no. 5, May 1978 the phase angle $\phi(t)$ is determined in TFM by the premodulation filter 1 in accordance with the formula $$\phi(t) = K_o \int_{-\infty}^{t} \left[ \sum_{n=-\infty}^{\infty} a_n \cdot g(\tau - nT) \right] \cdot d\tau + C_o$$

wherein $g(\tau)$ is the transfer function of the premodulation filter 1 and $K_o$ the sensitivity of the modulator 5 in radians/volts/second, and wherein $C_o$ is an arbitrary constant.

For the generation of TFM signals, this premodulation filter 1 comprises a non-recursive second order digital filter 6 and connected to a low-pass filter 8 which satisfies the third Nyquist criterion.

Figure 2:
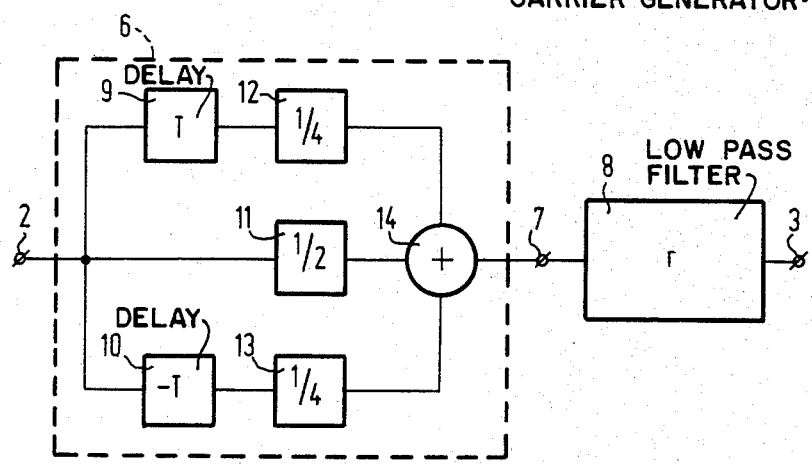
FIG. 2 shows a prior art premodulation filter employed in the transmitter of FIG. 1 for generating a TFM signal.

This premodulation filter 1 is shown in greater detail in FIG. 2. In addition to the fact that in the filter 6 the input signal is multiplied in a manner not shown by a constant $C = \pi/2K_o$, an adder 14 determines the sum of the undelayed input signal multiplied by C, after having been multiplied in multiplier 11 by a weighting factor of $\frac{1}{2}$, with two other signals. The first of these other signals is the input signal multiplied by C and delayed by one bit period T in a delay element 9, after having been multiplied in multiplier 12 by a weighting factor $\frac{1}{4}$. The second of these other signals is of the input signal multiplied by C and delayed by one bit period $-T$ in a delay element 10, after having been multiplied in multiplier 13 by a weighting factor $\frac{1}{4}$.

Consequently, the transfer function $S(\omega)$ of this filter 6 is equal to:

$$S(\omega) = C[\tfrac{1}{4}\exp -j\omega t + \tfrac{1}{2} + \tfrac{1}{4}\exp j\omega t] = C \cos^2(\omega T/2)$$

This signal is applied to the low-pass filter 8, the transfer function $H(\omega)$ of which is defined by $$H(\omega) = [(\omega T/2)/(2 \sin (\omega T/2))] \cdot N_1(\omega)$$

wherein $N_1(\omega)$ is the Fourier spectrum of a function which satisfies the first Nyquist criteron and for which the raised cosine type function is selected, so that it holds for $N_1(\omega)$ that:

$$N_1(\omega) = \begin{cases} 1 \text{ for } 0 \leq |\omega| \leq \pi \cdot (1-r)/T \\ [1 - \sin\{((T\omega - \pi)/2r)\} \text{ for } \pi(1-r)/T \leq |\omega| \leq \pi \leq (1+r)/T \\ 0 \text{ for all the remaining values of } \omega \end{cases}$$

The so-called roll off factor r is chosen to be less than 0.25.

The transfer function $G(\omega)$ of the premodulation filter 1, wherein the narrowest band width (r=0) is chosen for $H(\omega)$, consequently amount to;

$$G(\omega) = \begin{cases} C \cdot \omega T \cdot \cos^2(\omega T/2)/2(\sin(\omega T/2)) \text{ for } \\ |\omega| \leq \pi/T \text{ and} \\ 0 \text{ for all the remaining values of } \omega \end{cases}$$

The corresponding impulse response $g(t)$ is determined and consequently the information-carrying, time-varying phase angle $\phi(t)$.

Figure 3:
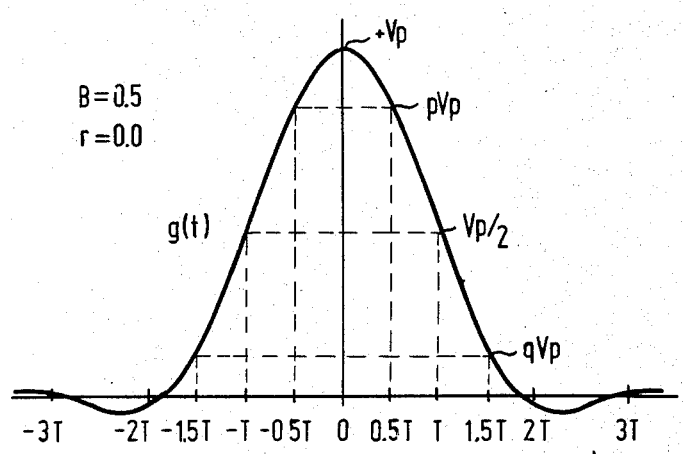
FIG. 3 shows the impulse response of the premodulation filter shown in FIG. 2.
Figure 4:
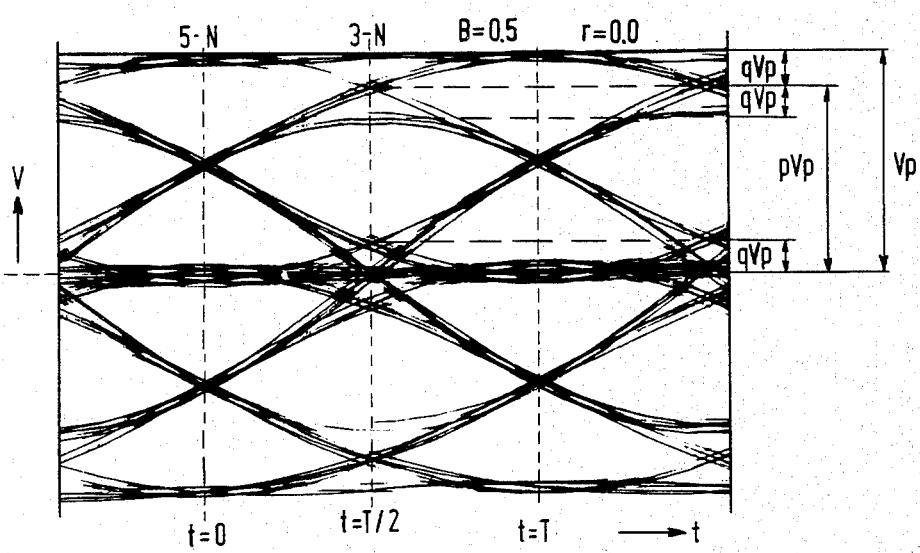
FIG. 4 shows the eye pattern obtained by means of the premodulation filter of FIG. 2.

The impulse response of this pre-modulation filter 1 is shown in FIG. 3. The values of the impulse response for the sampling instants $t = nT$, wherein $n = 0, 1, 2, \ldots$ are, in accordance with this Figure, equal to $V_p$ for $t=0$, equal to $V_p/2$ for $t=T$ and approximately equal to zero for $t=2T$. Owing to the fact that for $t=T$ the impulse response is unequal to zero, intersymbol interference occurs. Since a data signal $a_n$ is equal to $+1$ or $-1$, the signal supplied by the pre-modulation filter 1 has, because of the intersymbol interference, five possible values. The eye pattern of the signal supplied by the pre-modulation filter of FIG. 2 is shown in FIG. 4. In this Figure the quantity $V = a_n \cdot g(T-nT)$ is plotted versus the time. From this FIG. 4 it can be seen that the signal has the above-mentioned five signal levels at the sampling instants $t=nT$. A non-coherent receiver comprising a frequency demodulator arranged for receiving such a TFM-modulated signal is rather complicated because of the five signal levels. In order to enable the use of a simpler, non-coherent signal receiver the signal is not detected at the instants $t=nT$ but at the instants $t=(2m-1)T/2$ wherein $m = 0, 1, 2, \ldots$ etc., as is extensively described in the non-prepublished Netherlands Patent Application no. 8200943 (PHN 10.292).

In order to optimize the signal detection at the instants $t=(2m-1)T/2$ in the receiver the transmitter must be modified.

FIG. 4 shows that at the instants $t=(2m-1)T/2$ the eye pattern is not optimum. The reason is that the impulse response shown in FIG. 3 has the value $pV_p$ at $t=T/2$ and the value $q V_p$ at the instant $t=3T/2$. The result is that in FIG. 4 there occurs at the instant $T/2$ not only the values $p V_1$ and zero but also a widening of these values by at the utmost the value $q V_p$ upwards and downwards. Consequently, the pre-modulation filter 1 as shown in FIG. 2 is not so suitable.

Figure 5:
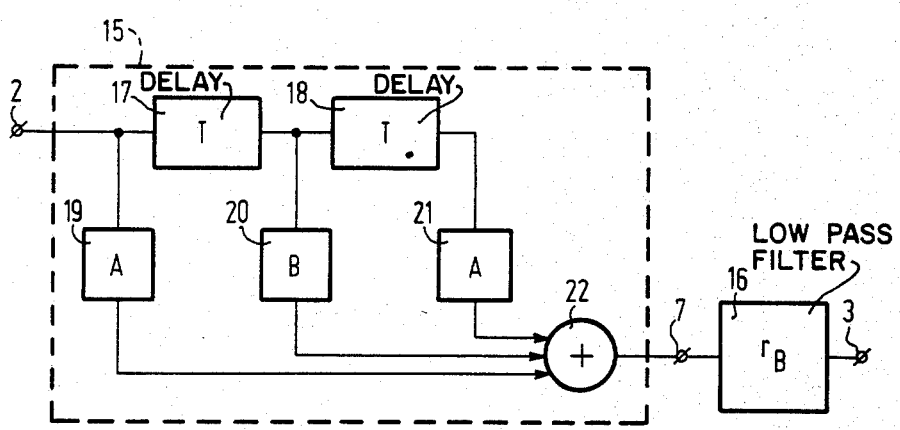
FIG. 5 shows an embodiment of a premodulation filter in accordance with the invention.

By a modification of modifying the pre-modulation filter 1 of FIG. 2 an optimum eye can be obtained at the detection instants $t=(2m-1)T/2$. Such a modified filter 15 is shown in FIG. 5.

This filter 1 also comprises a non-recursive second order digital filter 15 and, connected thereto, a low-pass filter 15 which satisfies the third Nyquist criterion. The digital filter 15 comprises two series-arranged delay elements 17 and 18, each having a time delay of one bit period T. These branches comprising multipliers 19, 20 and 21 for multiplying the undelayed incoming signal by a weighting factor A, for multiplying the incoming signal delayed by one bit period T by a weighting factor B and for multiplying the output signal of element 17 delayed by one bit period T by a weighting factor A. The weighting factors A and B have been chosen so that, disregarding the previously mentioned factor C, it holds that $2A + B = 1$. The signals thus obtained are added together in an adder 22 and applied to a low-pass filter 16, which satisfies the third Nyquist criterion. After having been filtered by this low-pass filter, the signals are applied to the modulator input 3.

The values of the weighting factor A and B, respectively are then less than ¼ and larger than ½, respectively, these values holding for a TFM signal. A FM signal modulated by a signal obtained by means of the pre-modulation filter 1 of FIG. 5, the weighting factor B being unequal 0.5, will be designated hereinafter "generalized tamed frequency modulated signal", abbreviated to "GTFM".

Such a GTFM signal must satisfy the requirement that a maximally open three-level eye must be realized at the detection instants $t=(2m-1)T/2$, which signal is a pseudo five-level signal at the sampling instants $t=nT$. For that purpose the values of the weighting factors of the filter 15 and consequently the values of the five-level eye at the sampling instants $t=nT$ must be changed such that it is possible that at the detection instant $t=(2m-1)T/2$ the eye pattern can only have three levels. On the other hand the roll-off factor r of the low-pass filter 16, which roll-off factor influences the variation of the signal between the values at the sampling instants $t=nT$, must be given such a value $r_B$ that at the detection instants $t=(2m-1)T/2$ the eye pattern has also the three abovementioned values. The subscripts$_B$ added to the roll-off coefficient r indicate that a specific value of the roll-off coefficient is added to each value B of that weighting factor which is unequal to one of the two other weighting factors.

Figure 6:
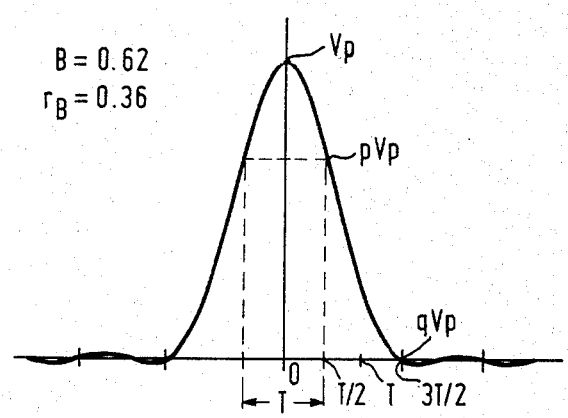
FIG. 6 shows the impulse response of the premodulation filter of FIG. 5 for B=0.62 and $r_B$=0.36.

FIG. 6 shows the impulse response g(t) of the pre-modulation filter 1 in accordance with FIG. 5 for the weighting factor B=0.62 and an associated roll-off coefficient $r_B=0.36$. As is shown in this Figure, the value of the impulse response is equal to p $V_p$ at the instant=T/2 and the value of the impulse response q $V_p$ is equal to zero at the instant $t=3T/2$. As a result thereof intersymbol intereference at the detection instants $t=(2m-1)T/2$ is prevented from occurring.

Figure 7:
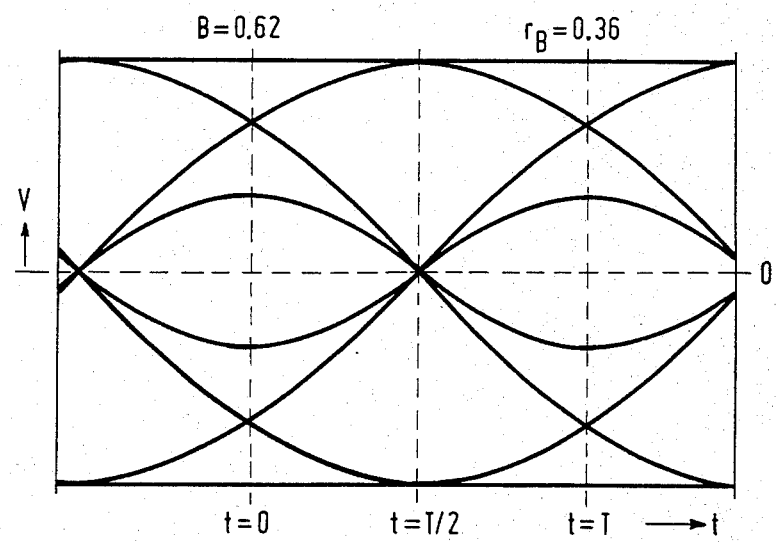
FIG. 7 shows an eye pattern obtained by means of the premodulation filter of FIG. 5 for B=0.62 and $r_B$=0.36.

The eye pattern obtained with this pre-modulation filter 1 is shown in FIG. 7. This Figure clearly shows an optimally open, three-level eye at the instant $t=T/2$, which accomplishes an optimum signal-to-noise ratio. However, the five-level eye at the instant $t=0, T, \ldots$ is considerably deteriorated thereby.

Figure 8:
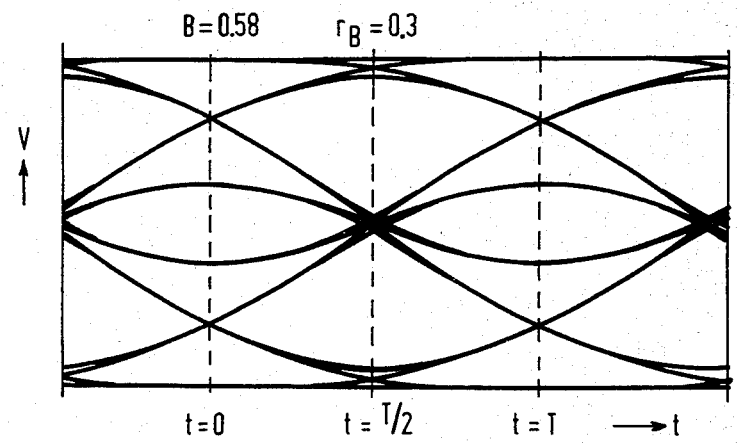
FIG. 8 shows an eye pattern obtained by means of a premodulation filter of FIG. 5 for B=0.58 and $r_B$=0.3
Figure 9:
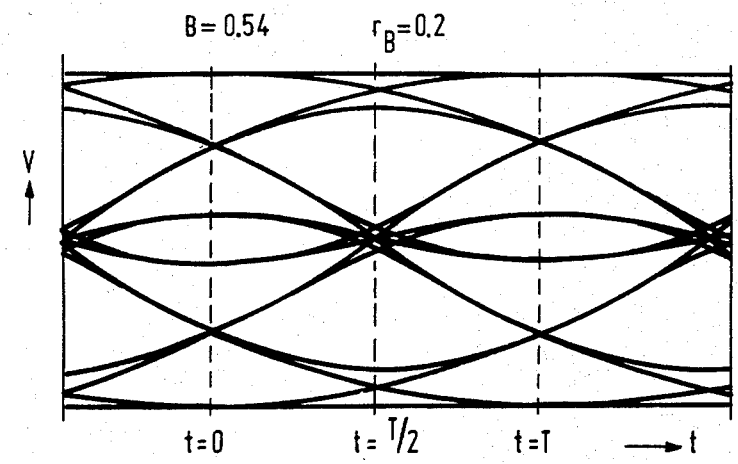
FIG. 9 shows an eye pattern obtained by means of a premodulation filter of FIG. 5 for B=0.54 and $r_B$=0.2.

FIG. 9 shows the eye pattern for a value of the weighting factor B equal to 0.58 and the associated optimum value of the roll-off coefficient $r_B$ equal to 0.3. The values of the eye pattern at the instants $t=(2m-1)T/2$ deviate only little from the values of the ideal three-level eye pattern shown in FIG. 7. The same applies for a value of the weighting factor B equal to 0.68 and an associated roll-off coefficient $r_B$, this value of B being located at an equally large distances but at the other side of the optimum values of B=0.62 as regards the values of the eye pattern shown in FIG. 8.

FIG. 9 shows the eye pattern for the values B=0.54 and $r_B=0.2$. This Figure clearly shows a deviation from the ideal eye pattern at the instant $t=T/2$ as compared with the eye pattern shown in FIG. 7, which deviation is still larger for the eye pattern, shown in FIG. 4, of a TFM signal. In practice, a good three-level eye is obtained at the detection instants $t=(2m-1)T/2$, for values of the weighting factor B located between 0.54 and 0.66 and for the associated roll-off coefficient $r_B$, which can be determined empirically, for example by means of computer simulation techniques. While the invention has been described in terms of a specific embodiment, other embodiments will be realized in accordance with the claims which follow.

What is claimed is:

1. In a system of frequency modulating a carrier signal with a data signal, which data signal has five signal levels when sampled at sampling instants $t=nT$, where T is the bit period of said data signal, and n is the number of bits of said data signal, a premodulation filter, to which are incoming data signal to be transmitted is applied, for supplying said data signal, said data signal now having three signal levels when sampled at sampling instants $(2m-1)T/2$, where m is an integer, comprising:

a non-recursive second order digital filter connected to receive said incoming data signal and providing first and second delayed signals, means for multiplying said first signal by a factor A, and said second signal by a factor B, where B lies between a value of 0.54 and 0.66, and wherein $2A+B=1$, means for multiplying said incoming data signal by a factor A forming a third signal, and means for combining said third signal with said multiplied first and second signals to provide an oupput signal; and a lowpass filter which satisfies the third Nyquist criterion realized by means of a raised cosine filter satisfying the first Nyquist criterion having a roll-off coefficient, rb, between 0.2 and 0.42, said lowpass filter receiving said output signal from said digital filter and supplying said data signal.

2. The premodulation filter of claim 1 wherein said first and second delayed signals are provided from a series circuit of first and second delay elements each having a delay of T seconds.

* * * * *